Dec. 21, 1937.  E. H. LAND  2,102,632
VIEWING SCREEN FOR USE IN OPTICAL SYSTEMS EMPLOYING POLARIZED LIGHT
Filed June 2, 1936

INVENTOR
Edwin H. Land
BY Brown & Jones
ATTORNEYS

Patented Dec. 21, 1937

2,102,632

UNITED STATES PATENT OFFICE 2,102,632

VIEWING SCREEN FOR USE IN OPTICAL SYSTEMS EMPLOYING POLARIZED LIGHT

Edwin H. Land, Wellesley Farms, Mass., assignor to Sheet Polarizer Company, Inc., Union City, N. J., a corporation of New Jersey Application June 2, 1936, Serial No. 83,038

11 Claims. (Cl. 88—1)

This invention relates to a new and improved viewing screen or visor for use in connection with optical systems employing polarized light.

An object of the invention is to provide a viewing screen or visor which may be adapted under certain conditions to block or greatly reduce a beam of polarized light projected from the headlights of an automobile and which may be adapted under other conditions to block or greatly reduce glaring light reflected from the surface of a road or the like.

Other objects of the invention are to provide a viewing screen or visor for use in illuminating systems employing polarized light and adapted when in one position to block polarized light of a predetermined characteristic, or having a predetermined direction of vibration and adapted when in another position to block polarized light having a different predetermined plane of vibration; to provide such a viewing screen or visor which may comprise a light-polarizing element positioned in such a manner that changes in the position of the viewing visor or screen effect no appreciable change in the relative position of the polarizing axis of the polarizer; to provide such a viewing screen as an attachment for use in the elimination of automobile headlight glare and road glare; and to provide such a viewing screen in the form of a relatively thin, composite, sheet-like element.

Further objects of the invention are to provide a viewing screen of the character described adapted to block plane-polarized light vibrating in a substantially horizontal plane and impinging upon one face of the screen, and simultaneously to block plane-polarized light vibrating in a plane substantially 45° to the horizontal and impinging upon the other face of the screen; to provide means whereby the screen may be moved into position so that either of its faces may first intercept a beam of light propagated in a direction toward an observer positioned behind the screen.

A still further object of the invention is to provide a screen adapted when in one position to block plane-polarized light and adapted when in another position to block circularly polarized light, and to provide such a mounting for said screen as to permit it to be moved into either operative position.

A still further object of the invention is to provide a light-polarizing screen adapted to substantially block plane-polarized light vibrating in a horizontal plane, and to provide in cooperative relation with said screen a removable element adapted to cooperate with said screen to cause said combination to block polarized light of a different character or having a different plane of vibration from that blocked by said polarizing element alone.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which.

Figure 1:
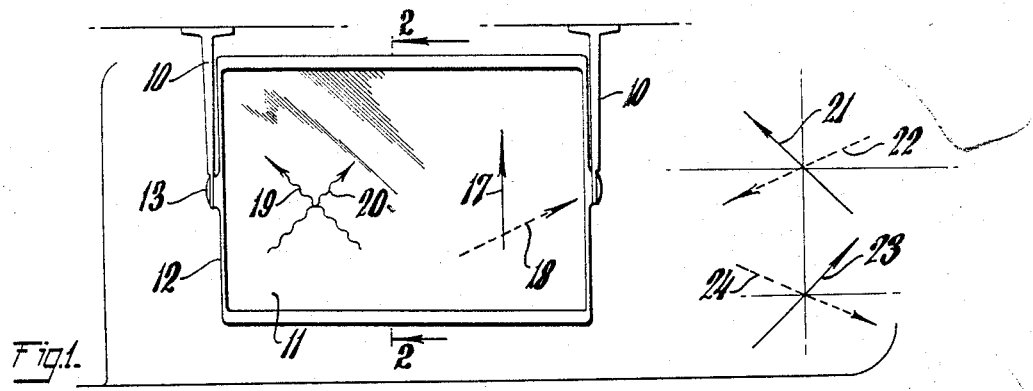
Fig. 1 is a plan view in somewhat diagrammatic form of a device embodying one form of the invention.

It has heretofore been suggested that polarized light be employed as a means of illuminating the pathway of a vehicle, and that suitable analyzing or blocking screens be employed by the observers of such polarized light sources in order that the beams emitted from said light sources and falling directly upon said screens may be blocked and thus the glare from the light source reduced or eliminated. Such a system has been particularly suggested for use in the elimination of automobile headlight glare.

In this connection it has been found desirable, where plane-polarized light is employed to illuminate the pathway of a vehicle, to equip each vehicle in such a way that the polarizing screen associated with the headlight has its axis at 45° to the vertical or horizontal, and the polarizing element associated with the viewing screen of the same car has its polarizing axis parallel to that of the headlight screen. Under these circumstances the beam emitted from the headlight of a car is polarized in a plane such that the windshield or viewing screen of the car will pass light so polarized. Hence light reflected from objects illuminated by the headlight is not blocked by the viewing screen of the same car, even though the reflected light is not depolarized.

Such a system is illustrated and described at somewhat greater length in my issued Patent No. 2,031,045.

Another preferred method of utilizing polarized light to eliminate or reduce headlight glare comprises the utilization of a system of circularly or elliptically polarized light such as is described in detail in my copending application Serial No. 714,239. In such a system a composite circular polarizer may preferably be employed comprising a sheet of plane-polarizing material with an associated quarter-wave plate so mounted with respect to the polarizer that the axes of the quarter-wave plate are at an angle of 45° to the polarizing axis of the polarizing sheet.

It has been found that much if not all of the glaring light reflected from the road or from other flat, smooth surfaces is polarized, and where the surface is horizontal or substantially horizontal, the plane of polarization of this reflected light is such that the light vibrates in a horizontal plane. It is therefore highly desirable that a viewing screen be provided of a character adapted to block this horizontal, plane-polarized, glaring, reflected light in order that even during daytime driving the observer may be subjected to a minimum of eye-strain.

Where either of the two preferred illumination systems described is employed, the polarizing visor or viewing screen is ordinarily not adapted to block the horizontally vibrating reflected road glare. In the first system described the polarizing axis of the viewing screen or visor is at an angle of 45° to the horizontal, and in the second system employed the polarizing visor is adapted to block only circularly polarized light and will transmit plane-polarized light irrespective of the direction of vibration thereof. This invention contemplates the provision of a viewing screen or visor which is adapted either to block the horizontally-vibrating, plane-polarized, reflected road glare, or the polarized headlight beam of an approaching vehicle employing, for example, either of the two illumination systems already described.

In Fig. 1 a device embodying the present invention is shown. Suitable mounting means comprising brackets and supporting rods 10 are provided, and the viewing screen or visor 11 may be mounted therebetween. The viewing screen may comprise any suitable frame 12, pivotally mounted for example as at 13 in the supporting members 10. Within the frame 12 there may be provided, as shown in Fig. 2, a polarizing element 15 and a cooperating half-wave plate 16 mounted, if desired, between two protective transparent elements 14 which may be sheets of glass or any other suitable medium.

Figure 2:
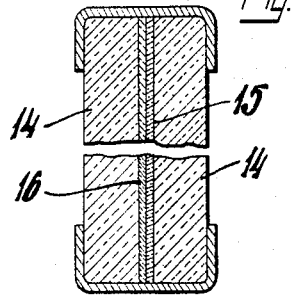
Fig. 2 is a sectional view along the line 2—2 of Fig. 1 of the device shown in Fig. 1.

In the embodiment of the invention shown in Figs. 1 and 2, it is contemplated that plane-polarized light is employed in the illumination of the pathway of the vehicle, and that the plane of polarization of the headlight beam projected from the headlights of the vehicle equipped with the screen 11 is vibrating in the direction shown by the arrow 19 in Fig. 1. If all cars are similarly equipped, the plane of polarization of the beam emitted from an approaching car will be that illustrated by the arrow 20 in Fig. 1, for change in direction of travel of the vehicle will effect an apparent rotation of 90° in the plane of polarization of the emitted headlight.

The arrow 17 in Fig. 1 may be taken as illustrating the polarizing axis of the polarizing element 15; as shown this axis is vertical and the element is accordingly positioned to block polarized light vibrating in a horizontal plane.

Associated with the polarizing element 15 there may be employed a half-wave plate 16, which if desired may be integrally united to the polarizing element in any suitable manner. Any suitable material may be employed as a half-wave plate. Doubly refractive, regenerated cellulosic material, such for example as the material sold under the trade name "Cellophane," has been found satisfactory when employed in suitable thicknesses. Mica or cellulose acetate sheeting made under such conditions that the micells are oriented, may also be employed in the proper thickness, as may other materials.

The half-wave plate is so positioned that it will cause rotation of the polarized beam impinging upon the viewing visor through an angle such that the beam will be caused to vibrate in a horizontal plane. Where, as shown in Fig. 1, the polarized beam impinging upon the viewing visor is vibrating in the direction shown by the arrow 20, the axis of the half-wave plate 16 should be positioned as shown by the arrow 18, at approximately 22½° to the horizontal, forming with the direction of the vibration of the beam of polarized light impinging upon the windshield an angle of approximately 22½°. The half-wave plate effects a rotation of twice the angle its axis makes with the plane of vibration of the polarized beam, and hence if the half-wave plate is positioned with its axis as shown by the arrow 18 in Fig. 1, an effective rotation of the plane of polarization of the impinging beam is produced, whereby that beam is blocked by the polarizing element 15. Under these circumstances the visor 11 acts to block the projected plane-polarized beam even through the polarizing axis of the element 15 of the visor is vertical, while the plane of polarization of the impinging beam is at an angle of 45° to the vertical.

In the form shown in Fig. 1, the viewing visor is pivotally mounted about a horizontal axle, so that when it is turned on the pivots 13 through an angle of 180° the polarizing element 15 will be between the light source and the half-wave plate 16. When in this position the visor is adapted to block horizontally-vibrating plane-polarized light, for the half-wave plate, no longer interposed between the light source and the polarizing element, becomes ineffective, and the polarizing element alone functions. Under such circumstances the visor is adapted for daytime use to block road glare.

A preferred form of light-polarizing material for use in the present invention is that made and sold under the trade-name "Polaroid." This material comprises a transparent, set suspending medium, having dispersed and embedded therein a mass of polarizing particles with their polarizing axes oriented to substantial parallelism. Such a material may be obtained in sheet-like form. It is thin, pliable, substantially colorless, and highly efficient as a polarizer. It may be readily laminated or affixed to glass and to the half-wave plate employed. It has an unlimited angular aperture and transmits the desired component of the polarized beam without appreciable scattering. It may also be obtained in any desired area.

It will of course be understood that while one form of the invention may comprise an arrangement wherein the half-wave plate is effective in night driving to rotate the plane of polarization of the beam emanating from the headlight of an approaching car, and is ineffective in daytime driving by reason of the rotation of the viewing screen, the invention contemplates also the use of the combination in such a manner that the polarizing axis of the viewing screen may be positioned to block the impinging polarized headlight beam without the aid of the half-wave plate, the half-wave plate under such circumstances being between the polarizer and the observer when the screen is used for night driving, and the axis of the half-wave plate being so positioned with respect to the axis of the polarizer that when the screen is rotated, so that the half-wave plate is interposed between the roadway and the polarizer, the half-wave plate will effect such rotation of horizontally-vibrating plane-polarized light as to cause that light to be blocked by the polarizing element when the screen is employed in connection with daytime driving for the elimination of road glare.

The arrows 21 and 22 to the right of Fig. 1 may be taken as illustrating respectively the polarizing axis of the light-polarizing element and the axis of the half-wave plate with the screen in position to block the impinging beam polarized, as shown by the arrow 20 in Fig. 1. Under these circumstances the half-wave plate, being between the polarizer and the eyes of the observer, does not function to rotate the plane of polarization of the impinging beam. The arrows 23, 24 to the right of Fig. 1 may be taken as illustrating the position respectively of the polarizing axis of the polarizing element and the axis of the half-wave plate when the viewing screen is rotated so that the half-wave plate lies between the light source and the polarizing element. It will be noted that the half-wave plate, the axis of which is at an angle of 22½° to the horizontal, will cause a rotation of horizontally plane-polarized light so that it will be blocked by the polarizing sheet with its axis positioned as at 23, at an angle of 45° to the horizontal.

Figure 3:
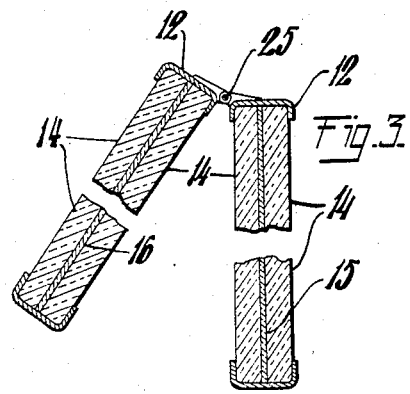
Fig. 3 is a sectional view in somewhat diagrammatic form of a modification of the invention shown in Fig. 1.

In Fig. 3 a modification of the invention is shown wherein the light-polarizing element 15 and its associated protective covering plates, if any, 14, may be permanently positioned before the eyes of an observer, and wherein the half-wave plate 16 with its associated protective elements, if any, 14, may be hinged as at 25, so as to be swung up and away from association with the polarizing sheet. Under these circumstances, when the half-wave plate is swung upward, as shown in Fig. 3, and when the polarizing axis of the element 15 is vertical, as for example shown by the arrow 17 in Fig. 1, the device is adapted to block road glare, and when the half-wave plate is dropped into operative position with the polarizing element, the device may be adapted to block a polarized headlight beam vibrating in a plane 45° to the horizontal, as for example illustrated by the arrow 20 in Fig. 1. Under these circumstances it will be understood that the axis of the element 16 in Fig. 3 would be positioned as shown, for example, by the arrow 18 of Fig. 1.

Figure 4:
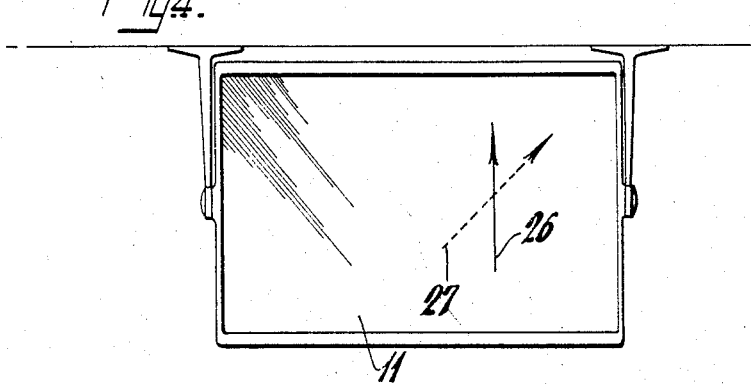
Fig. 4 is a view similar to Fig. 1 of a modified form of the invention.

In Fig. 4 there is shown somewhat diagrammatically a modification of the device shown in Fig. 1 adapted for use in connection with an illuminating system employing circularly polarized light, by which term it is intended to include all clockwise or counterclockwise rotating polarized beams, including beams elliptically polarized. In this figure, 11 again represents the viewing screen or visor which may comprise a pair of protective elements, such for example as glass sheets, a light-polarizing element, and a quarter-wave plate. A cross-sectional view of the device shown in Fig. 4 would look like the section shown in Fig. 2, where the elements 14 would represent the glass sheets or protective elements, the element 15 the light-polarizing element, and the element 16 the quarter-wave plate. The arrow 26 represents the polarizing axis of the polarizing element of the combination. The axis is preferably vertical, so that the polarizing element may, when the visor 11 is pivoted in such a way that the polarizer is positioned between the quarter-wave plate and the source of the impinging polarized beam, be adapted to block horizontally polarized light, such for example as the light reflected from the surface of a road. The quarter-wave plate is positioned with its axis at an angle of 45° to the polarizing axis of the polarizing element, and when the viewing screen or visor 11 is rotated so that the quarter-wave plate is positioned between the polarizer and the light source of the polarized beam impinging thereon, the viewing visor will be adapted to transmit circularly polarized light having a predetermined direction of rotation and to block circularly polarized light having the opposite direction of rotation. It will be understood that the visor is adapted to block circularly polarized light emanating from the headlights of an approaching car and to pass reflected circularly polarized light emanating from the headlights of the car equipped with the visor, all as more fully described in my copending application Serial No. 714,239.

It will be understood furthermore that the structure shown in Fig. 4 may, if desired, be modified in the manner shown, for example, in Fig. 3, i. e., the quarter-wave plate may be detachably mounted with respect to the light-polarizing element so that it may be swung out of relation therewith, in which case the polarizer alone would be adapted to function precisely as does the polarizer with the device shown in Fig. 3, while the quarter-wave plate will cooperate therewith when in association therewith to block circularly polarized light of a predetermined direction of rotation.

It will be noted that in every case the viewing visor or screen described is adapted to block plane-polarized light impinging upon one of its faces, while the screen is adapted to block either a differently polarized beam or a beam polarized but vibrating in a different plane and impinging upon the other face of the viewing screen or visor.

The device of this invention may be readily fixed in position before the eyes of a passenger in an automobile. It is thin, durable, easily handled and manipulated. It needs only to be rotated about the axis along which it is pivoted to be adapted for use either for daytime driving or for night driving. During daytime driving the device of the invention may function to substantially completely eliminate road glare and other glaring light reflected from the surface on which the automobile rests, such as substantially horizontal surfaces, and during night time driving it may function to substantially eliminate the glare from automobile headlights employing either of the two preferred systems of illuminating by polarized beams.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In an automotive vehicle or the like, a viewing screen comprising a sheet-like light-polarizing element adapted, when the elements of said screen are in a predetermined position, to block polarized light vibrating in a plane substantially parallel to the surface upon which said vehicle rests, and wave retardation means mounted for movement into and out of position between said light-polarizing means and a source of polarized light impinging thereon, and being adapted, when interposed between said light source and said light-polarizing means, for causing said screen to block polarized light of a different predetermined character or direction of vibration from that blocked by said light polarizing element, the optical axes of said wave retardation means being positioned at predetermined angles to the polarizing axis of said polarizing element.

2. In an automotive vehicle or the like, a viewing screen comprising a light polarizing element adapted to plane polarize a beam of light traversing said element, and a phase-changing element adapted to alter the characteristics or direction of vibration of a beam of polarized light traversing said element and having its axis at predetermined angles to the polarizing axis of said light polarizing element, and mounting means adapted to so position the elements of said viewing screen that either said light polarizing element or said phase-changing element may be interposed between a predetermined light source and the other of said elements.

3. A pivotally mounted viewing screen for use in connection with the elimination of glare from the head-lamps of automotive vehicles or the like comprising a light-polarizing element and a cooperating half-wave plate mounted with an optical axis at an angle of substantially $67\frac{1}{2}°$ to the polarizing axis of said light polarizing element, said screen being adapted to block polarized light vibrating in a substantially horizontal plane and impinging upon one face thereof, and being adapted to block polarized light vibrating in a plane substantially 45° from the horizontal and impinging upon the other face thereof.

4. A pivotally mounted viewing screen for use in connection with the reduction of headlight glare in automotive vehicles and the like comprising a sheet-like light-polarizing element and a wave retardation element fixedly mounted with respect thereto with its axes at predetermined angles to the polarizing axis of said light polarizing element and adapted, when in a predetermined position, to block polarized light vibrating in a substantially horizontal plane, and adapted, when pivoted through an angle of approximately 180° from said position, to block polarized light having a predeterminedly different character or direction of vibration.

5. A viewing screen comprising a light-polarizing element and a quarter wave element mounted with its axes at angles of approximately 45° to the polarizing axis of said light polarizing element, whereby said screen is adapted to block plane-polarized light vibrating in a predetermined plane and impinging on one face of said screen, and circularly polarized light impinging upon the other face of said screen, and mounting means adapted to position said screen so that either face thereof may be initially interposed in the path of a beam of light.

6. A viewing screen comprising a light-polarizing element and a half-wave plate positioned with an optical axis at an angle of approximately $67\frac{1}{2}°$ to the polarizing axis of said light polarizing element, whereby said screen is adapted to block plane-polarized light vibrating in a predetermined plane and impinging on one face of said screen, and plane-polarized light vibrating in a plane at approximately 45° to the first-mentioned plane and impinging upon the other face of said screen, and mounting means adapted to so position said screen that either face thereof may be initially interposed in the path of a beam of light.

7. A viewing screen comprising a light-polarizing element and a half-wave plate positioned to overlie one surface of said light polarizing element, the polarizing axis of the polarizing element being positioned at an angle of approximately $112\frac{1}{2}°$ to an axis of the half-wave plate, said polarizing element and said half-wave plate being so mounted that they may be pivoted as a unit through an angle of approximately 180°, whereby a beam of light emanating from a predetermined source may impinge initially upon either said polarizing element or said half-wave plate.

8. A viewing screen comprising a light-polarizing element positioned to block plane-polarized light vibrating in a substantially horizontal plane, a quarter-wave plate mounted to overlie one face of said light polarizing element and positioned with its axis at an angle of substantially 45° to the polarizing axis of said light-polarizing element, and mounting means to position said elements so that said quarter-wave plate may be interposed between or removed from between a light source and said light-polarizing element.

9. In combination, a substantially flat, unitary, transparent viewing screen comprising a light-polarizing element and a wave retardation device mounted thereon with its axes at predetermined angles to the polarizing axis of said light polarizing element, mounting means to pivotally position said viewing screen, said screen being adapted, when in one position, to block substantially horizontally vibrating plane-polarized light, and being adapted, when pivoted through an angle of 180°, to block polarized light having a different characteristic or direction of vibration.

10. A viewing screen for use in connection with the elimination of glare from the headlights of automotive vehicles or the like comprising a relatively thin, sheet-like, light polarizing element having affixed to one face thereof a wave retardation device, the optical axes of said wave retardation device being positioned at predetermined angles to the polarizing axis of said sheet-like light polarizing element, and mounting means, including a pivotally mounted frame adapted to position said screen so that it may be rotated through an angle of 180°, whereby either face thereof may be interposed between a predetermined light source and the other face thereof.

11. In combination, a light polarizing element mounted to block horizontally vibrating plane polarized light, and a wave retardation device pivotally mounted between a light source and said polarizing element and adapted to be swung into position to overlie one face of said element, the axes of said wave retardation device when in said overlying position being positioned at predetermined angles to the polarizing axis of said light polarizing element, whereby horizontally vibrating plane-polarized light impinging upon the face of said wave retardation device may be transmitted by said polarizing element and certain other polarized light impinging on said wave retardation device may be blocked by said polarizing element.

EDWIN H. LAND.